US010447102B2

(12) United States Patent
Patterson et al.

(10) Patent No.: US 10,447,102 B2
(45) Date of Patent: Oct. 15, 2019

(54) PERMANENT MAGNET ELECTRICAL MACHINES AND METHODS OF ASSEMBLING THE SAME

(71) Applicant: Regal Beloit Australia PTY LTD, Rowville, Victoria (AU)

(72) Inventors: Dean James Patterson, Murwillumbah (AU); Rafal Pawel Rohoza, Surrey Hill (AU); Steven Peter Camilleri, Darwin (AU); Matthew Turner, Menzies Creek (AU); Charles Richard Langford, Grays Point (AU)

(73) Assignee: Regal Beloit Australia Pty. Ltd., Rowville, Victoria (AU)

( * ) Notice: Subject to any disclaimer, the term of this patent is extended or adjusted under 35 U.S.C. 154(b) by 590 days.

(21) Appl. No.: 13/841,851

(22) Filed: Mar. 15, 2013

(65) Prior Publication Data

US 2014/0265700 A1 Sep. 18, 2014

(51) Int. Cl.
*H02K 1/27* (2006.01)
*H02K 21/24* (2006.01)

(52) U.S. Cl.
CPC ......... *H02K 1/2793* (2013.01); *H02K 1/2753* (2013.01); *H02K 21/24* (2013.01); *Y10T 29/49009* (2015.01)

(58) Field of Classification Search
CPC ............ H02K 1/22; H02K 21/12; H02K 1/27; H02K 1/2793; H02K 1/274; H02K 1/2746;

(Continued)

(56) References Cited

U.S. PATENT DOCUMENTS 5,691,683 A * 11/1997 Allwine, Jr. ............. G01B 7/30 335/302
5,977,684 A * 11/1999 Lin ........................ H02K 21/12 310/178

(Continued)

FOREIGN PATENT DOCUMENTS

JP 02262863 A * 10/1990
JP 07213041 A * 8/1995

(Continued)

OTHER PUBLICATIONS

Asano et al. (JP 2010259251 A) English Translation.*

(Continued)

*Primary Examiner* — Quyen P Leung
*Assistant Examiner* — Robert E Mates
(74) *Attorney, Agent, or Firm* — Armstrong Teasdale LLP

(57) ABSTRACT

An electric machine comprising a permanent magnet rotor assembly is provided. The electric machine comprises a permanent magnet rotor assembly comprising a plurality of permanent magnets coupled to a rotor disk and a plurality of magnet shims coupled to the plurality of permanent magnets opposite the rotor disk. Each magnet shim of the plurality of magnet shims has a substantially complementary shape as a respective permanent magnet of the plurality of permanent magnets. The electric machine further comprises a stator core comprising a plurality of stator teeth that define a plurality of slots therebetween. At least one of the plurality of magnet shims is configured to direct magnetic flux from at least one of the plurality of permanent magnets to at least one stator tooth of the plurality of stator teeth.

20 Claims, 7 Drawing Sheets

(58) Field of Classification Search

CPC .... H02K 1/2753; H02K 1/276; H02K 1/2766; H02K 21/24; Y10T 29/49009

USPC .... 310/268, 156.32, 156.48, 156.49, 156.51, 310/156.52, 156.53, 156.54, 156.55, 310/156.56, 156.57, 156.58, 156.5, 9, 310/156.61, 156.62, 156.63, 156.64, 310/156.65

See application file for complete search history.

(56) References Cited

U.S. PATENT DOCUMENTS

| | | | | |
|---|---|---|---|---|
| 6,335,582 | B1 * | 1/2002 | Abukawa et al. | 310/214 |
| 6,441,522 | B1 * | 8/2002 | Scott | 310/156.23 |
| 6,873,066 | B2 * | 3/2005 | Yamamoto et al. | 310/12.26 |
| 2001/0048249 | A1 * | 12/2001 | Tsuboi | H02K 41/031 310/12.04 |
| 2004/0194286 | A1 * | 10/2004 | Rose | H02K 21/12 29/596 |
| 2006/0131986 | A1 * | 6/2006 | Hsu et al. | 310/268 |
| 2009/0230811 | A1 * | 9/2009 | Asano | F04C 23/008 310/216.001 |
| 2009/0273252 | A1 * | 11/2009 | Nakamasu et al. | 310/156.07 |
| 2010/0071971 | A1 * | 3/2010 | Tatematsu et al. | 180/65.8 |
| 2011/0133596 | A1 * | 6/2011 | Asano | H02K 1/2793 310/268 |
| 2011/0148224 | A1 * | 6/2011 | Tokoi | H02K 1/2793 310/43 |
| 2011/0241460 | A1 * | 10/2011 | Mebarki | H02K 1/20 310/64 |
| 2012/0104880 | A1 * | 5/2012 | Takemoto et al. | 310/44 |

FOREIGN PATENT DOCUMENTS

| | | | | |
|---|---|---|---|---|
| JP | 2000050605 | A | * | 2/2000 |
| JP | 2010142080 | A | * | 6/2010 |
| JP | 2010166661 | A | * | 7/2010 |
| JP | 2010259251 | A | * | 11/2010 |

OTHER PUBLICATIONS

Asano (JP 2010259251 A) English Translation.*
Asano (JP 2010142080 A) English Translation.*
Merriam-Webster definition of monolithic (May 15, 2017).*
Watanabe (JP 02262863 A) English Translation.*
Shiraki (JP 07213041 A) English Translation (Year: 1995).*
Shiraki (JP 2000050605 A) English Translation (Year: 2000).*
Asano (JP 2010166661 A) English Translation. (Year: 2010).*
U.S. Appl. No. 13/224,834, filed Sep. 2, 2011.
PCT Application No. PCT/US/29378 filed Mar. 22, 2011.

* cited by examiner

PERMANENT MAGNET ELECTRICAL MACHINES AND METHODS OF ASSEMBLING THE SAME

BACKGROUND

The embodiments described herein relate generally to permanent magnet electrical machines, and more particularly, to methods and systems for steering magnetic flux using a permanent magnet rotor.

Permanent magnet electrical machines are used in a wide variety of systems operating in a wide variety of industries, such as in pump systems or air handling units. As such, permanent magnet electrical machines are subject to many operating conditions. In such a machine, the torque resulting from the magnetic interaction between the rotor and stator may be reduced by eddy currents generated by magnetic flux flowing through the magnets. Eddy currents are created when a magnet experiences a change in the intensity or direction of the magnetic flux at any point within the magnet. These eddy currents generate resistive losses resulting in less torque production, and therefore a less efficient machine. Furthermore, eddy currents may transform some forms of energy, such as kinetic rotational energy, into heat. Excessive heat produced by the eddy currents also reduces the machine's efficiency and may lead to the failure of an adhesive used to retain the permanent magnets on the spinning rotor. The loss of magnet retention causes significant damages to the machine and may lead to machine failure.

More specifically, rotor magnets passing through the open area between stator teeth, coupled with the attraction to and repulsion from the solid teeth of the stator, cause vibrations, cogging torque, and potentially motor noise, any amount of which may be objectionable to a user. Audible machine noise is unacceptable in many applications. Further, the cogging and the torque pulses at the shaft of the machine may be transmitted to a fan, blower assembly or other driven equipment/end device that is attached to the shaft. In such applications these torque pulses and the effects of cogging may result in operational deficiencies and/or acoustical noise that can be objectionable to an end user of the machine.

Semi-closed stator slots used in known electric machines typically include tooth extensions at the tip of the stator tooth that may concentrate the magnetic flux and minimally dissipate the eddy currents within the permanent magnets. The tooth extensions serve the primary purpose of improving the effective flux distribution between the rotor and the stator and may reduce the eddy currents and cogging torque in a permanent magnet machine. However, semi-closed stator slots typically increase the complexity and expense of coil winding machinery. Stators that incorporate semi-closed slots with tooth extensions are more difficult to fabricate, and the area available for the copper wire windings that can be inserted or wound into such slots is limited. As such, open slot or nearly open slot stators are preferred for manufacturing reasons, as the wire for the windings can be inserted into the slots with greater ease and at reduced cost.

BRIEF DESCRIPTION

In one aspect, a permanent magnet rotor assembly is provided. The permanent magnet rotor assembly comprises a rotor disk and a plurality of permanent magnets coupled to the rotor disk. The rotor assembly further comprises a plurality of magnet shims coupled to the plurality of permanent magnets opposite the rotor disk. Each magnet shim of the plurality of magnet shims has a substantially complementary shape as a respective permanent magnet of the plurality of permanent magnets. The plurality of magnet shims are configured to direct magnetic flux from at least one of the plurality of permanent magnets to at least one stator tooth of a stator core.

In another aspect, an electric machine is provided. The electric machine comprises a permanent magnet rotor assembly comprising a plurality of permanent magnets coupled to a rotor disk and a plurality of magnet shims coupled to the plurality of permanent magnets opposite the rotor disk. Each magnet shim of the plurality of magnet shims has a substantially complementary shape as a respective permanent magnet of the plurality of permanent magnets. The electric machine further comprises a stator core comprising a plurality of stator teeth that define a plurality of slots therebetween. At least one of the plurality of magnet shims is configured to direct magnetic flux from at least one of the plurality of permanent magnets to at least one stator tooth of the plurality of stator teeth.

In yet another aspect, a method of assembling a permanent magnet machine is provided. The method comprises providing a plurality of permanent magnets and coupling the plurality of permanent magnets to a rotor disk. A plurality of magnet shims are coupled to the plurality of permanent magnets opposite the rotor disk and a stator core that includes a plurality of stator teeth is positioned proximate the plurality of magnets shims to define an air gap therebetween. The method further comprises directing magnetic flux from at least one of the plurality of permanent magnets across the air gap to at least one stator tooth of the plurality of stator teeth utilizing at least one of the plurality of magnet shims.

DETAILED DESCRIPTION

Figure 1:
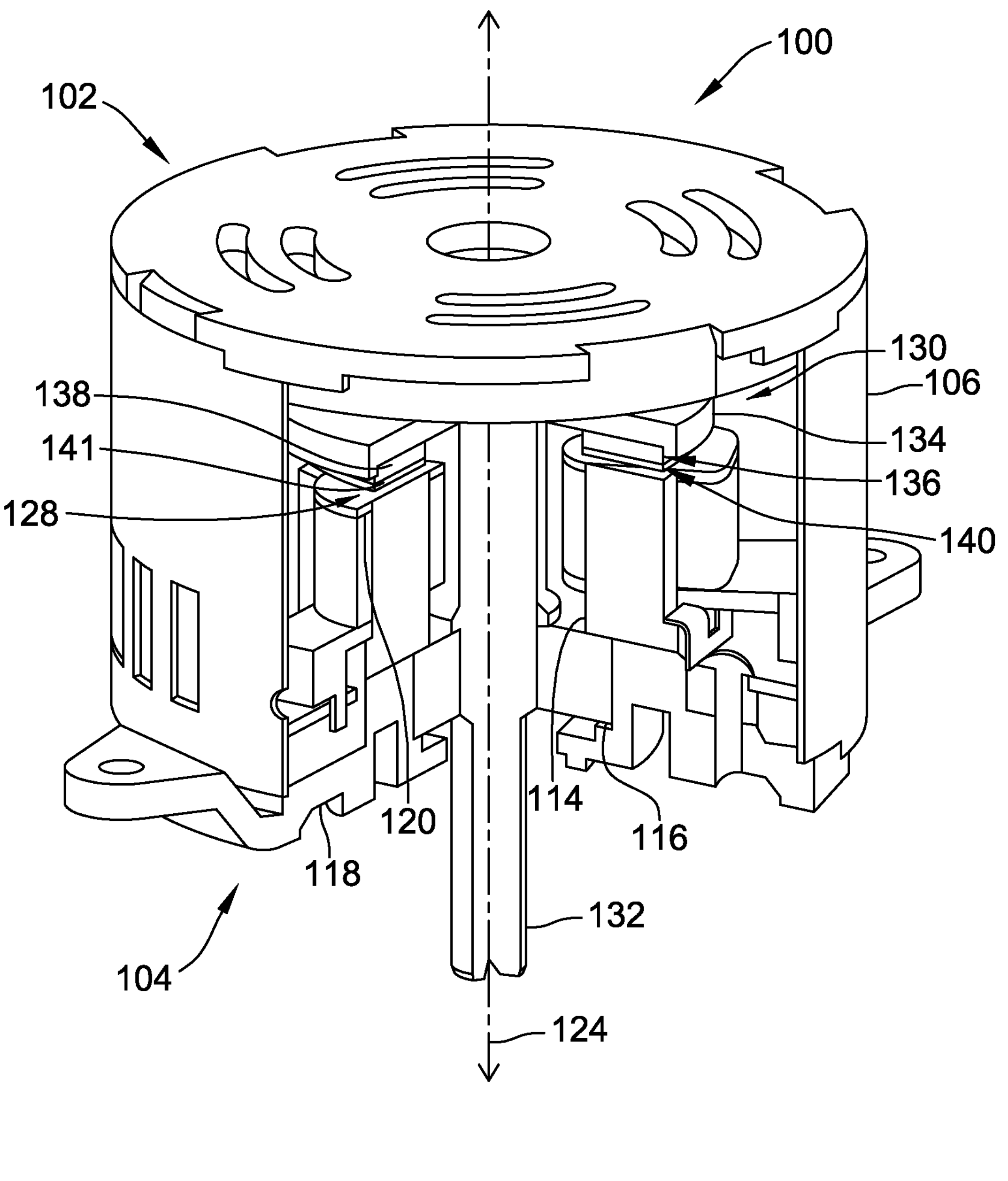
FIG. 1 is a partial cut-away view of an exemplary axial flux electric machine.
Figure 2:
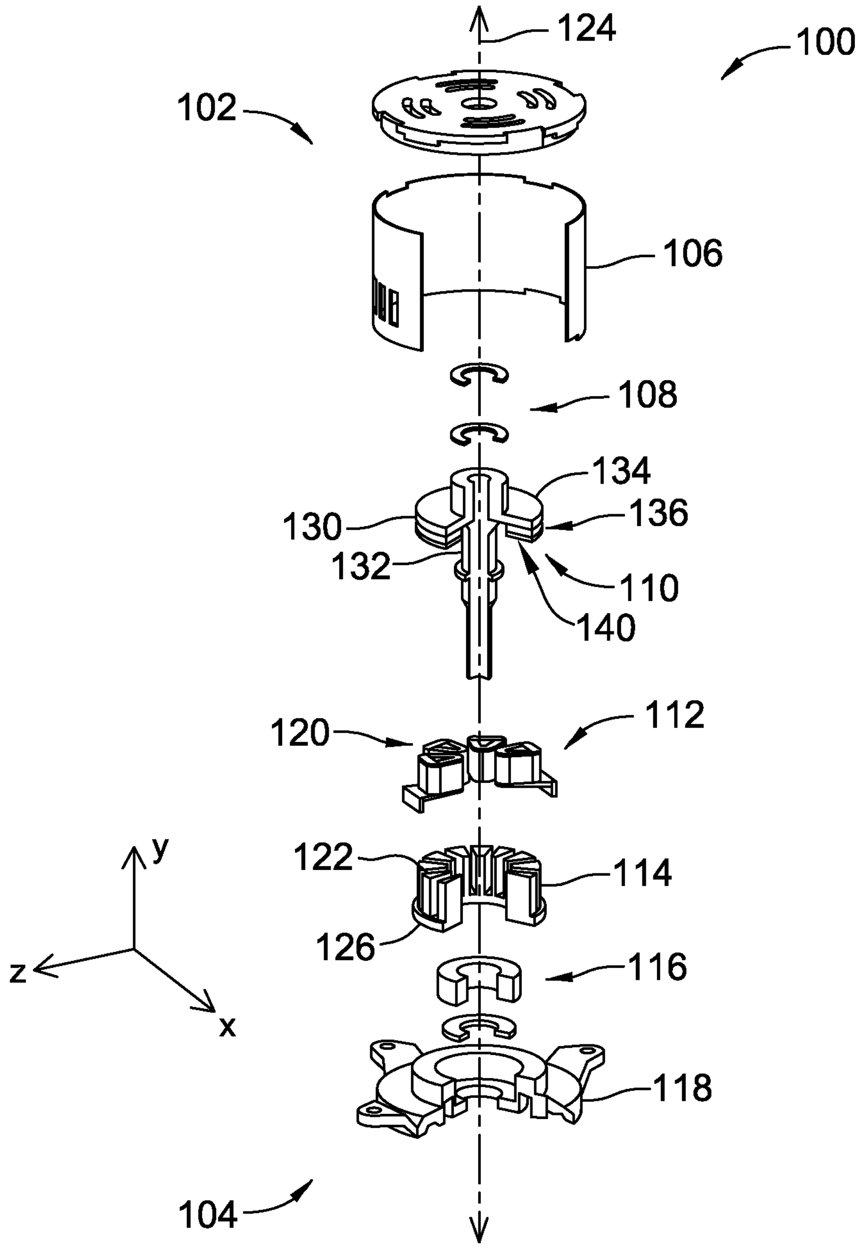
FIG. 2 is an exploded, partially cut-away view of the axial flux machine shown in FIG. 1.

FIG. 1 is a partial cut-away view of an exemplary embodiment of an axial flux electric machine 100. FIG. 2 is an exploded, partially cut-away, view of axial flux electric machine 100. Although machine 100 is described herein as an axial flux machine, machine 100 may alternatively be a radial flux machine. In the exemplary embodiment, electric machine 100 is an electric motor. Alternatively, electric machine 100 may operate as either a motor or a generator. Components common to FIGS. 1 and 2 are identified with the same reference numerals. Components are described herein as including a top surface 102 generally facing what is referred to herein as a top of machine 100, and a bottom surface 104 generally facing what is referred to herein as a bottom of machine 100.

In the exemplary embodiment, electric machine 100 is coupled to a work component (not shown) included within a commercial and/or industrial application. The work component may include, but is not limited to, a pump system, an air handling unit, and/or manufacturing machinery (e.g., conveyors and/or presses). In an alternative embodiment, the work component may include a fan for moving air through an air handling system, for blowing air over cooling coils, and/or for driving a compressor within an air conditioning/refrigeration system. More specifically, machine 100 may be used in air moving applications used in the heating, ventilation, and air conditioning (HVAC) industry.

Electric machine 100 includes a housing 106, a first bearing assembly 108, a rotor assembly 110, a bobbin assembly 112, a stator core 114, a second bearing assembly 116, and an end shield 118. Bobbin assembly 112 includes a plurality of bobbins 120 that each include an opening (not shown in FIGS. 1 and 2) that closely conforms to an external shape of one of a plurality of stator core teeth 122 such that each stator tooth 122 is configured to be positioned within a bobbin 120. Machine 100 may include one bobbin 120 per stator tooth 122 or one bobbin 120 positioned on every other tooth 122. In the exemplary embodiment, each bobbin 120 is configured to insulate a plurality of copper windings (not shown in FIGS. 1 and 2) such that each bobbin 120 electrically insulates one winding from a respective stator tooth 122.

Stator core 114 includes a plurality of stator teeth 122 that extend in the Y-direction (i.e., parallel to an axis of rotation 124) from a stator core base 126. Stator core 114 may include any suitable number of teeth 122 that allow machine 100 to function as described herein. In use, stator core base 126 disposed perpendicularly about rotational axis 124 and the plurality of teeth 122 extend in the Y-direction from stator core base 126 and form a slot (not shown in FIGS. 1 and 2) between each adjacent tooth 122. In the exemplary embodiment, stator core 114 is an open slot stator core, and as such, does not include tooth extensions that may extend from each side of each tooth 122 towards adjacent teeth 122. Furthermore, stator core 114 is an open slot stator core as each slot between adjacent stator teeth 122 is easily accessible for receiving a bobbin 120 from the plurality of bobbins 120, as described above. Alternatively, stator core 114 may be a high efficiency semi-closed stator core that includes tooth extensions.

Moreover, stator modules 84 are fabricated from a plurality of stacked laminated sheets 100. Such a construction simplifies the manufacturing process and enables modular stator modules 84 to be produced quickly and efficiently.

In the exemplary embodiment, stator core 114 is fabricated from a plurality of laminated sheets (not shown). Such a construction simplifies the manufacturing process and enables modular stator modules 84 to be produced quickly and efficiently. Alternatively, stator core 114 may be a solid, non-laminated stator core. Stator core 114 may be constructed using a sintering process from Soft Magnetic Alloy (SMA), Soft Magnetic Composite (SMC), and/or powdered ferrite material. Such materials allow for 3-dimensional magnetic flux paths and facilitate reducing high frequency losses (e.g., losses at frequencies above 60 Hz). Use of the sintered SMC or SMA also facilitates increasing control of an air gap 128 (shown in FIG. 1) which improves performance and minimizes noise.

In the exemplary embodiment, a variable frequency drive (not shown) provides a signal, for example, a pulse width modulated (PWM) signal, to electric machine 100. In an alternative embodiment, electric machine 100 may include a controller (not shown) coupled to bobbin assembly 112 and configured to apply a voltage to one or more of bobbins 120 at a time for commutating bobbin assembly 112 in a preselected sequence to rotate rotor assembly 110 about axis 124.

Rotor assembly 110 includes a rotor 130 coupled to a shaft 132. Rotor 130 includes a rotor disk 134, a plurality of permanent magnets 136 comprising at least one magnet 138, and a plurality of magnet shims 140 comprising at least one shim 141. Rotor assembly 110 is rotatable within housing 106 and more specifically, rotatable within first bearing assembly 108 and second bearing assembly 116 about axis 124. In the exemplary embodiment, rotor disk 134 is manufactured using a sintering process from, for example, Soft Magnetic Alloy (SMA), Soft Magnetic Composite (SMC), and/or powdered ferrite materials. In an alternative embodiment, rotor disk 134 is machined and/or cast from a solid metal, for example, steel.

In the exemplary embodiment, the plurality of permanent magnets 136 are coupled to rotor disk 134. Each magnet 138 of the plurality of permanent magnets 136 is a neodymium magnet, although, any suitable permanent magnet may be included that enables electric machine 100 to function as described herein. Each shim 141 of the plurality of magnet shims 140 is coupled to a bottom surface 104 of a respective magnet 138. Air gap 128 exists between bottom surfaces 104 of each shim 141 and a top surface 102 of stator core 114. More specifically, stator core 114 is positioned within machine 100 such that the plurality of stator teeth 122 are proximate the plurality of magnet shims 140 to define air gap 128 therebetween. Magnets 138 are fabricated as relatively thin segments of permanent magnet material. Each segment provides a substantially constant magnetic flux field (not shown in FIGS. 1 and 2) within machine 100. Alternatively, magnets 138 may be fabricated from a solid segment of permanent magnet material that provides a constant magnetic flux field. The flux field extends from the plurality of permanent magnets 136, through the plurality of magnet shims 140, to stator teeth 122 of stator core 114. In the exemplary embodiment, the plurality of permanent magnets 136 are symmetrical, which facilitates manufacturing a single magnet design for use of each of magnets 138 within the plurality of permanent magnets 136. Furthermore, each magnet 138 has a substantially flat profile which minimizes waste during manufacturing, and therefore, minimizes cost.

In the exemplary embodiment, rotor 130 includes as many shims 141 as magnets 138 such that each shim 141 is coupled to a respective magnet 138. Magnet shims 140 are manufactured from an isotropic SMC material and are coupled to bottom surface 104 of magnets 138 using an adhesive. Alternatively, shims 140 may be coupled to magnets 136 using any method that allows machine 100 to function as described herein. In the exemplary embodiment, shims 140 have a thickness of approximately 2 millimeters. Alternatively, shims 140 may have any thickness that enables machine 100 to function as described herein.

In operation, bobbins 120 coupled to stator core 114 are energized in a chronological sequence that provides an axial magnetic field which moves clockwise or counterclockwise around stator core 114 depending on the predetermined sequence or order in which bobbins 120 are energized. This moving magnetic field intersects with the flux field created by the plurality of permanent magnets 136 to cause rotor assembly 110 to rotate about axis 124 relative to stator core 114 in the desired direction to develop a torque which is a direct function of the intensities or strengths of the magnetic fields.

Figure 3:
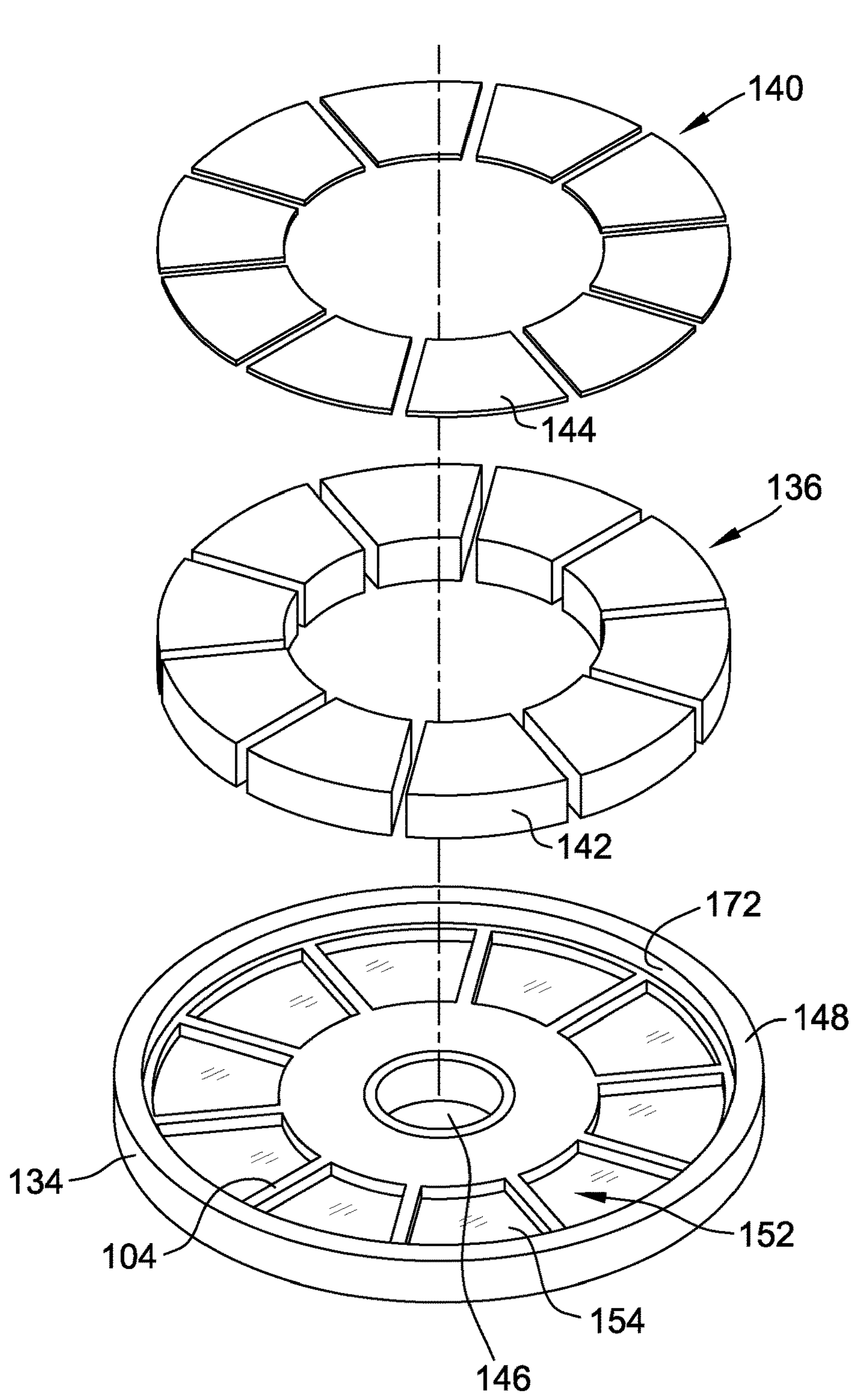
FIG. 3 is an exploded view of an exemplary embodiment of a rotor that may be included within the axial flux machine shown in FIGS. 1 and 2.
Figure 4:
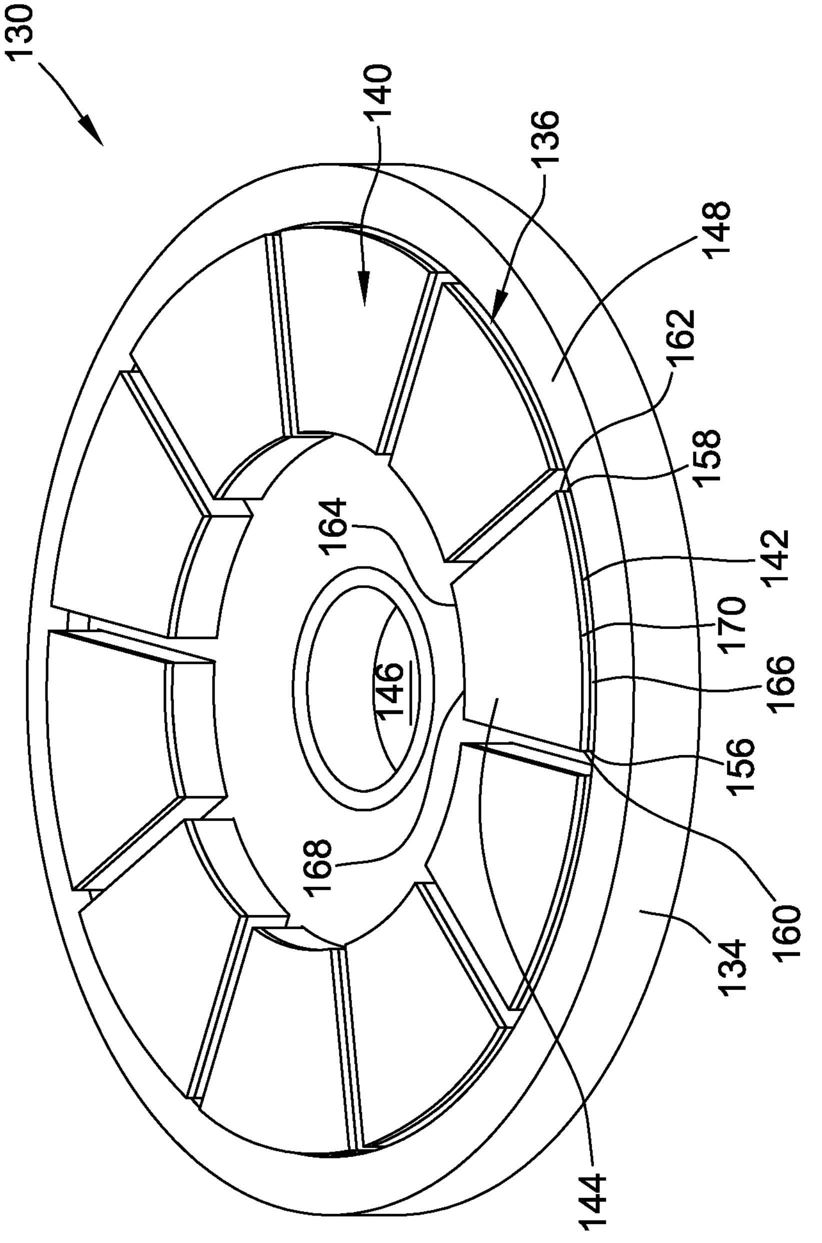
FIG. 4 is a perspective view of the assembled rotor shown in FIG. 3.

FIG. 3 is an exploded view of an exemplary embodiment of rotor 130 that may be included within axial flux machine 100 shown in FIGS. 1 and 2. FIG. 4 is a perspective view of assembled rotor 130 shown in FIG. 3. As described above, rotor 130 includes a rotor disk 134, a plurality of permanent magnets 136 comprising at least a first magnet 142, and a plurality of magnet shims 140 comprising at least a first shim 144. In the exemplary embodiment, rotor 130 includes ten magnets and ten shims evenly spaced about rotor disk 134. Other embodiments of rotor 130 may include any number of magnets and shims that enable machine 100 to function as described herein. Rotor disk 134 includes a shaft opening 146 that is configured to receive a shaft, for example, shaft 132 (shown in FIGS. 1 and 2). Rotor disk 134 also includes an outer rim 148 that extends axially from bottom surface 104 of rotor disk 134. Outer rim 148 includes at least an outer edge 150. In the exemplary embodiment, rotor disk 134, and more specifically, bottom surface 104, includes a plurality of recessed portions 152 comprising at least one recessed portion 154. In the exemplary embodiment, the plurality of recessed portions 152 are configured to accept the plurality of permanent magnets 136 such that first recessed portion 154 receives first magnet 142. First magnet 142 is coupled within first recessed portion 154 using an adhesive. Alternatively, first magnet 142 may be coupled within first recessed portion 154 by friction fit. In another embodiment, rotor disk 134 does not include the plurality of recessed portions 152 and the plurality of permanent magnets 136 are coupled directly to bottom surface 104 of rotor disk 134.

In the exemplary embodiment, each shim, for example first shim 144, includes a shape and a size approximately equal to that of a shape and a size of each respective magnet, for example, first magnet 142, such that substantially all of first magnet 142 is covered by first shim 144. Generally, each shim 144 is of a substantially complimentary size and shape as a respective magnet 142. More specifically, as shown in FIG. 4, first magnet 142 includes opposing side faces 156 and 158 that are flush with respect to respective corresponding opposing side faces 160 and 162 of first shim 144. Furthermore, first magnet 142 includes opposing inner and outer faces 164 and 166 that are flush with respect to respective corresponding opposing inner and outer faces 168 and 170 of first shim 144. Alternatively, the size of first shim 144 may be smaller than the size of first magnet 142 such that side faces 156 and 158 of first magnet 142 extend beyond corresponding sides faces 160 and 162 of first shim 144. Similarly, the size of first shim 144 may be larger than the size of first magnet 142 such that side faces 160 and 162 of first shim 144 extend beyond corresponding side faces 156 and 158 of first magnet 142. The remaining shims and magnets of pluralities 136 and 140 are similarly configured. Additionally, the plurality of magnet shims 140 may be a complete disk of SMC material coupled to bottom surface 104 of plurality of permanent magnets 136.

When rotor disk 134 rotates about axis 124 (shown in FIGS. 1 and 2), centrifugal forces act on the plurality of permanent magnets 136. Outer rim 148 prevents the plurality of permanent magnets 136 from moving radially outward from opening 146. Specifically, outer faces 166 and 170 contact inner edge 172 of outer rim 148 to prevent failure of rotor 130 and ensure the pluralities of permanent magnets 136 and magnets shims 140 remain coupled to disk 134. Furthermore, embedding plurality of permanent magnets 136 within the plurality of recessed portions 152 further enables the plurality of permanent magnets to be retained within rotor 130. Recessed portions 152 and outer rim 148 eliminate the need for an adhesive to retain the plurality of permanent magnets 136 in the radial direction. However, an adhesive may be used to prevent fretting corrosion due to vibration during operation or to couple the plurality of permanent magnets 136 to rotor disk 134 during handling and assembly of machine 100.

Figure 5:
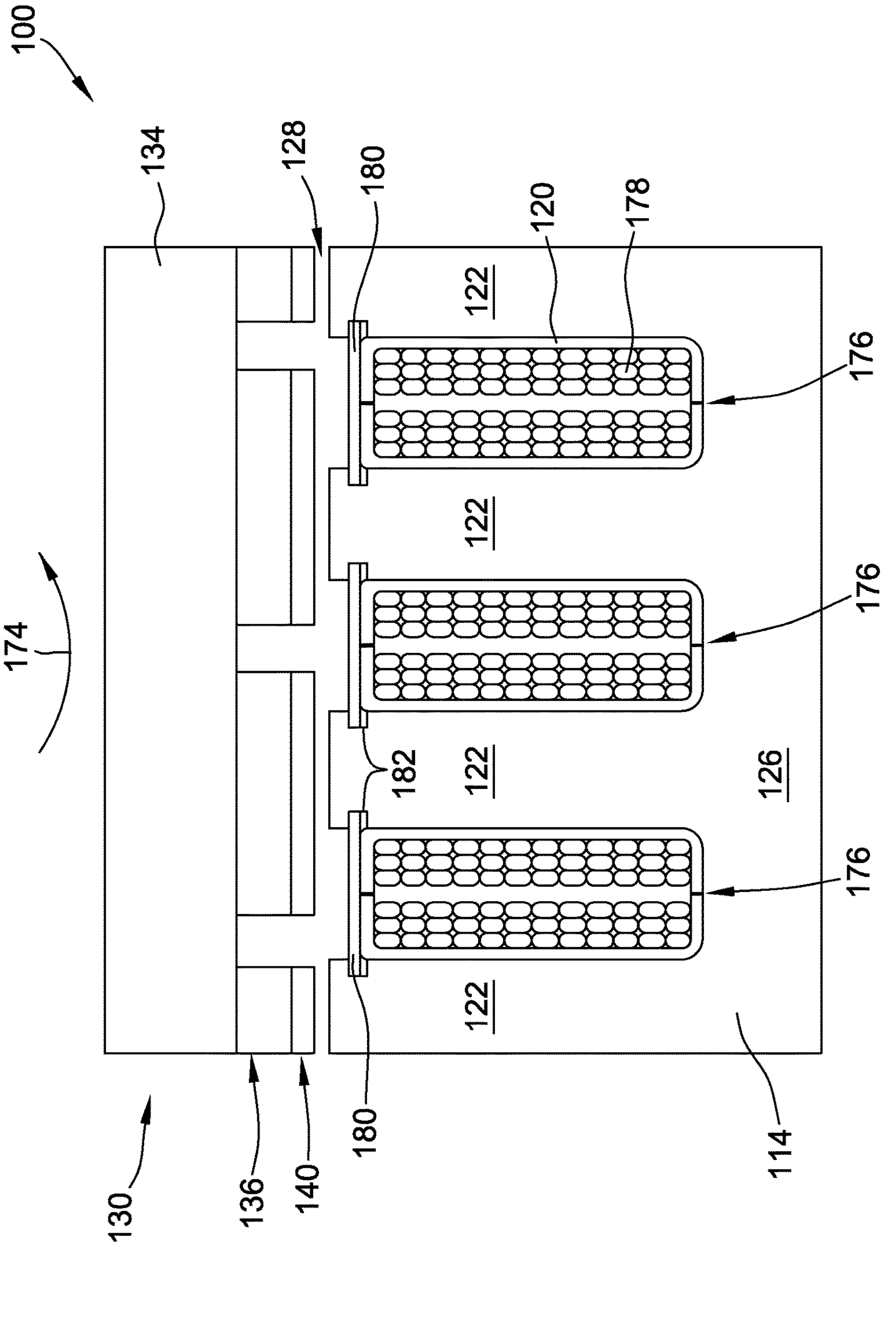
FIG. 5 is a schematic representation of the axial flux electric machine shown in FIGS. 1 and 2.

FIG. 5 is a schematic representation of operating axial flux electric machine 100 shown in FIGS. 1 and 2. In the exemplary embodiment, rotor 130, including rotor disk 134, the plurality of permanent magnets 136, and the plurality of magnet shims 140, rotates about axis of revolution 124 (shown in FIGS. 1 and 2) in the direction of arrow 174 with respect to stationary stator 114. As described above, machine 100 includes stator core 114 that includes a plurality of stator teeth 122 that extend axially from stator core base 126. Between adjacent stator teeth 122 is an open slot 176. Each slot 176 is configured to receive at least a portion of at least one bobbin 120. A plurality of copper windings 178 are housed within each bobbin 120 such that each bobbin 120 insulates a respective plurality of copper windings 178 from a respective stator tooth 122.

In the exemplary embodiment, stator core 114 is an open slot stator core that incorporates a plurality of retention members 180 each positioned between the individual teeth 122 of stator 114. Open slots 176 of stator core 114 allow for ease of manufacturing of stator core 114, bobbins 120, and windings 178, and, generally, assembly of machine 100. Retention members 180 operate in place of more standard insulating material to hold bobbins 120 in their respective slots 176. In the illustrated embodiment, each stator tooth 122 is formed to include an indentation 182 on each side of tooth 122. Retention members 180 are sized such that they may be positioned in corresponding indentations 182 of adjacent stator teeth 122. As described below, the use of retention members 180 allows the use of an open slot stator core, while achieving some of the performance benefits of a semi-closed stator slot.

In some embodiments, retention members 180 are fabricated utilizing a semi-magnetic material. In addition to maintaining placement of bobbins 120, the semi-magnetic properties of retention members 180 reduce pulsations and vibrations in permanent magnet motors. Further, efficiency, and motor generated back EMF (or voltage) is increased, resulting in a quieter and more efficient running motor. In one embodiment, retention members 180 are fabricated using a woven structure that is cured using a resin impregnated with a ferrous material, for example, iron powder. In another embodiment, shredded fiberglass, resin and ferrous material are extruded and cured to form retention members 180.

In operation, magnetic forces cause magnetic flux (not shown in FIG. 5) to flow from the plurality of permanent magnets 136 to the closest stator tooth 122. Generally, the more flux that is channeled from the plurality of permanent magnets 136 and captured by the plurality of stator teeth 122, the more torque is generated, and the more efficient machine 100 operates. Therefore, it is desirable to cause as much flux as possible to be captured by the plurality of stator teeth 122. However, because the plurality of permanent magnets 136 are rotating above stator core 114, magnets 136 are not always positioned directly over teeth 122 to allow for a straight flow path of flux from magnets 136 to teeth 122.

In known electric machines, the flux changes direction within the body of the magnet to reach the stator teeth. When flux shifts direction within the magnet, eddy currents are created which lead to heat generation and torque losses, resulting in a reduction in operating efficiency of the machine. Additionally, the heat produced by the eddy currents may cause failure of an adhesive used to retain the magnets within the rotor, which may cause the magnets to disengage from the rotor, resulting in failure of the machine. Furthermore, in known machines, some flux may not be channeled to the teeth and may leak to a different part of the rotor or the stator. Such leakage not only causes a reduction in torque generation, making the machine less efficient, but also causes an undesirable dynamic force distribution inside the machine that may lead to increased noise production and vibration.

Figure 6:
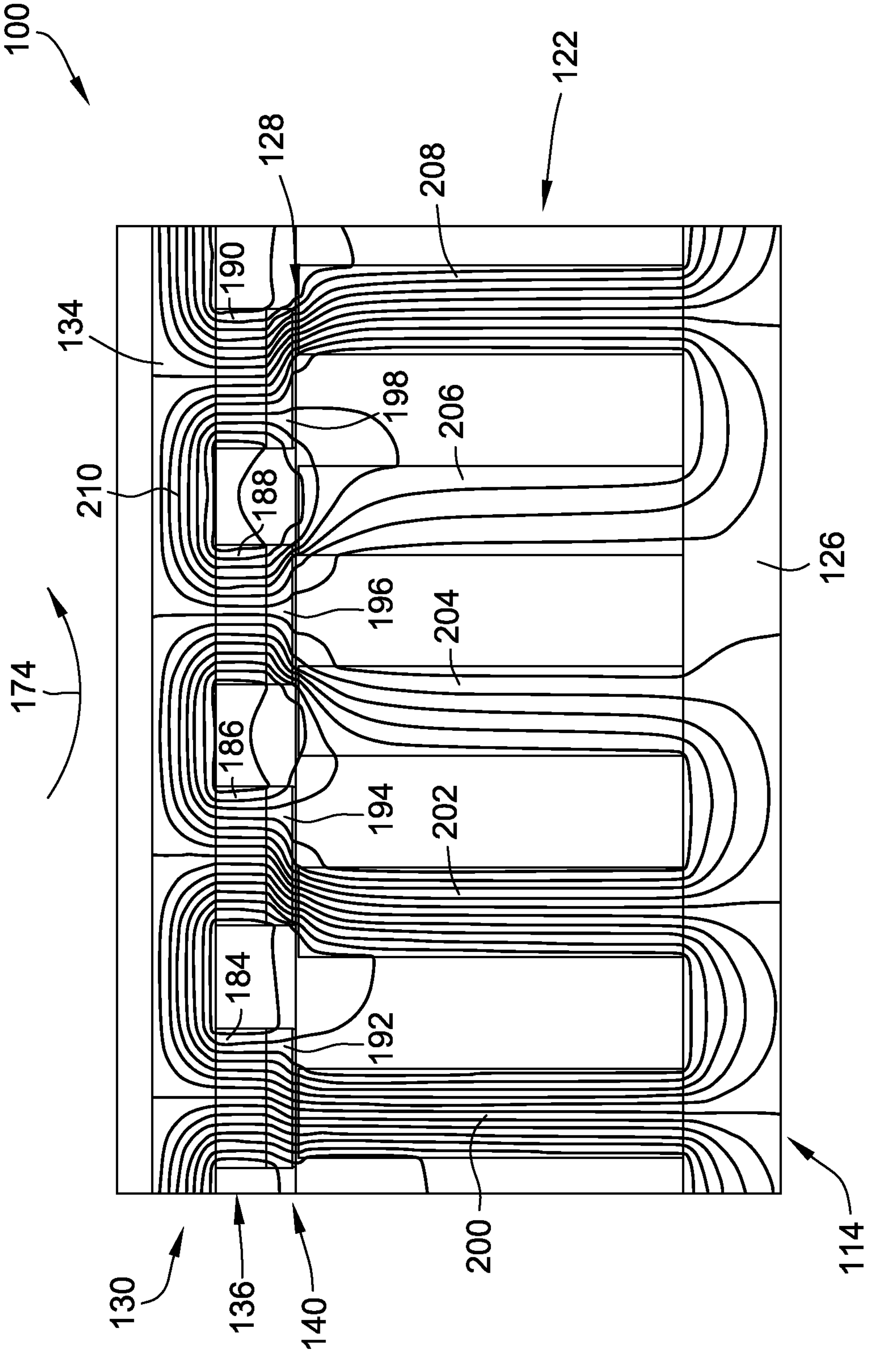
FIG. 6 is a schematic representation of the axial flux electric machine shown in FIGS. 1 and 2 illustrating the flow of magnetic flux

FIG. 6 illustrates an operating electric machine 100 at a point in time. In operation, rotor 130 rotates about axis 124 (shown in FIGS. 1 and 2) in direction of arrow 202 with respect to stator core 114. In the exemplary embodiment, rotor 130 includes rotor disk 134, the plurality of permanent magnets 136, and the plurality of magnet shims 140. More specifically, the plurality of magnets 136 includes first magnet 184, second magnet 186, third magnet 188, and fourth magnet 190. Furthermore, the plurality of magnet shims 140 includes first shim 192, second shim 194, third shim 196, and fourth shim 198. Stator core 114 includes stator core base 126 and the plurality of stator teeth 122. More specifically, the plurality of stator teeth 122 include first tooth 200, second tooth 202, third tooth 204, fourth tooth 206, and fifth tooth 208. Also illustrated in FIG. 6 is a plurality of flux lines 210 indicating the flow of magnetic flux in the exemplary embodiment of machine 100.

In the exemplary embodiment, flux 210 is directed from magnets 184, 186, 188, and 190 though shims 192, 194, 196, and 198 to stator teeth 200, 202, 204, 206, and 208. Specifically, substantially all of flux 210 generated by first magnet 184 is channeled through first shim 192 to first tooth 200. Furthermore, a majority of flux 210 generated by second magnet 186 is steered by second shim 194 to second tooth 202. Second shim 194 channels the remaining flux 210 generated by second magnet 186 to third tooth 204. Because third magnet 188 and third shim 196 are substantially equidistant from third and fourth teeth 204 and 206, approximately half the flux 210 generated by third magnet 188 is directed through third shim to each of third tooth 204 and fourth tooth 206. Fourth shim 198 channels a portion of flux 210 generated by fourth magnet 190 to fourth tooth 206 and a majority of flux 210 from fourth magnet 190 to fifth tooth 208. Generally, flux 210 is channeled by any of shims 192, 194, 196, or 198 to the nearest respective tooth 200, 202, 204, 206, or 208 such that the distribution of flux 210 generated by any one of magnets 184, 186, 188, or 190 may be divided between more than one of tooth 200, 204, 204, 206, or 208 as rotor 130 rotates above stator core 114.

In the exemplary embodiment, shims 192, 194, 196, and 198 are configured to facilitate a unidirectional flow of flux 210 through magnets 184, 186, 188, and 190 to prevent the formation of eddy currents within magnets 184, 186, 188, and 190. As such, the direction of the flow of flux 210 changes within shims 192, 194, 196, and 198 to be steered towards the nearest tooth 200, 202, 204, 206, and 208 instead of changing direction within magnets 184, 186, 188, and 190 themselves, which results in the formation of eddy currents. By steering flux 210 to teeth 200, 202, 204, 206, and 208 within shims 192, 194, 196, and 198, instead of within magnets 184, 186, 188, and 190, the formation of eddy currents within magnets 184, 186, 188, and 190 is eliminated. Specifically, flux 210 flows in a first direction within magnets 184, 186, 188, and 190 that may be different from a second direction of flux 210 flow within shims 194, 194, 196, and 198. The direction of flux 210 flow within magnets 184, 186, 188, and 190 is only the same as the direction of flux 210 flow within shims 192, 194, 196, and 198 when one of teeth 200, 202, 204, 206, or 208 is positioned directly beneath one of shims 192, 194, 196, and 198.

In the exemplary embodiment, shims 192, 194, 196, and 198 may direct flux along any path within shims 192, 194, 196, and 198 to teeth 200, 202, 204, 206, and 208 to facilitate capture of substantially all of flux 210 by teeth 200, 202, 204, 206, and 208. Because shims 192, 194, 196, and 198 facilitate the elimination of eddy currents, substantially all of flux 210 generated by magnets 184, 186, 188, and 190 is channeled to and captured by teeth 200, 202, 204, 206, and 208, resulting in higher torque production and more efficient operation of machine 100. Additionally, because substantially all of flux 210 is captured by teeth 200, 202, 204, 206, and 208, shims 192, 194, 196, and 198 facilitate reducing the leakage of flux 210 to components of machine 100 other than teeth 200, 202, 204, 206, and 208. The reduction of flux 210 leakage reduces the dynamic force distribution within machine 100 and, therefore, reduces the generation of endemic noise and vibrations. Furthermore, the elimination of eddy currents within magnets 184, 186, 188, and 190 reduces the amount of heat generated by machine 100, which results in higher efficiency and facilitates retention of magnets 184, 186, 188, and 190 within rotor 130.

Figure 7:
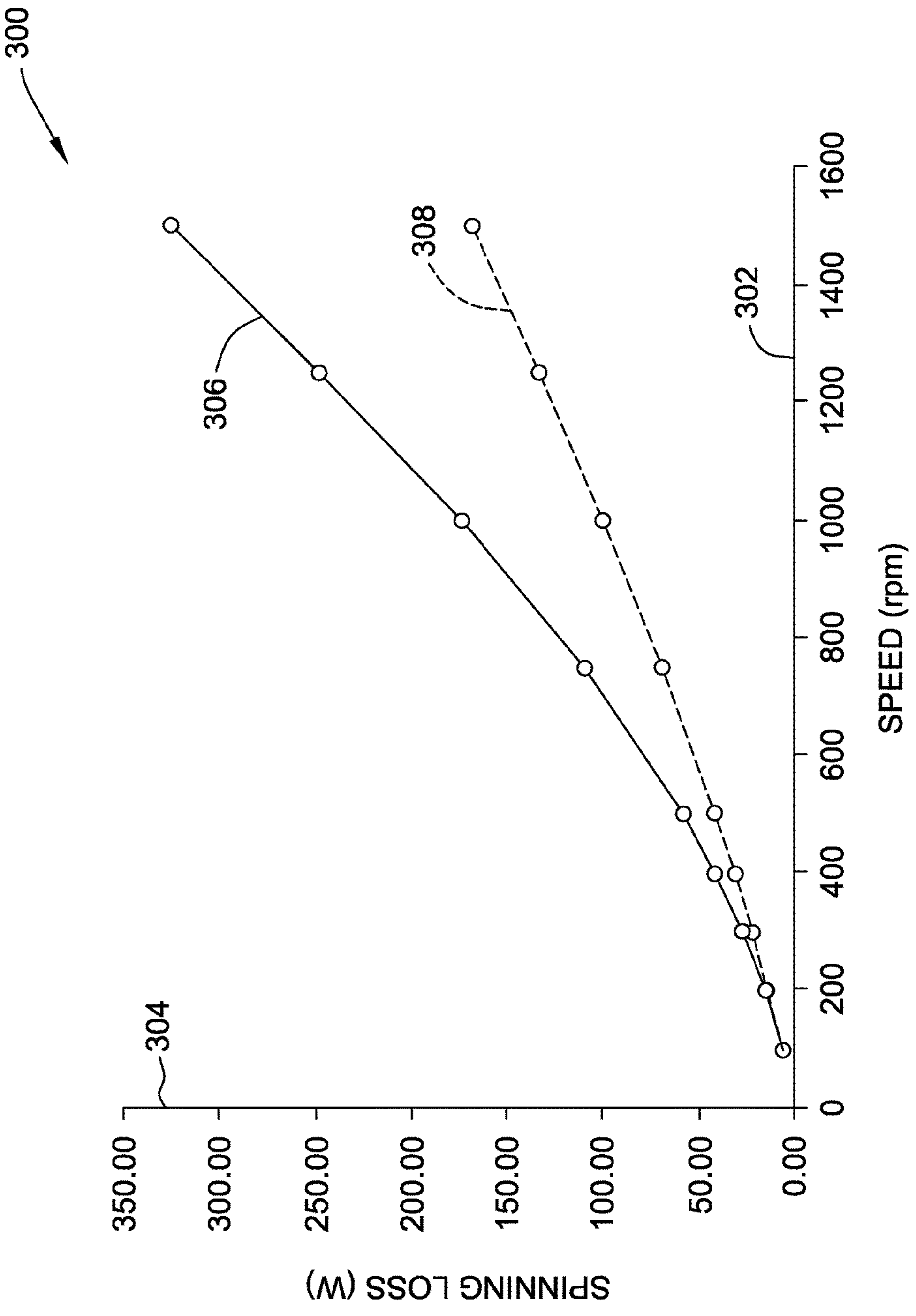
FIG. 7 is a graphical representation of a spinning loss verses rotational speed comparison between a known axial flux electric machine and the axial flux electric machine shown in FIGS. 1 and 2.

FIG. 7 is a graphical representation 300 of a spinning loss verses rotational speed comparison between a known axial flux electric machine without magnet shims 140 and axial flux electric machine 100 with shims 140. An x-axis 302 represents the revolutions per minute (RPM) of an operating machine, and a y-axis 304 represents the spinning losses measured in Watts (W). A reference line 306 represents an operating machine similar to machine 100 but without magnet shims 140. A reference line 308 represents axial flux electric machine 100 having shims 140. As shown in FIG. 7, reference line 306 indicates a spinning loss of approximately 320 W at a standard operating speed of 1500 RPM, while reference line 308 indicates spinning losses of only approximately 170 W at 1500 RPM. Graph 300 illustrates approximately a 53% drop in spinning losses resulting from the addition of the plurality of magnet shims 140 to machine 100. This drop in spinning losses translates to an approximate 2% overall increase in operating efficiency of machine 100.

The permanent magnet machine described herein includes a plurality of magnet shims that facilitate the elimination of eddy currents by directing the magnetic flux generated by a plurality of permanent magnets towards a plurality of stator teeth. Each shim is formed from an isometric SMC material that allows the flow of magnetic flux to change direction within the shims to prevent the formation of eddy currents within the magnets. The plurality of shims facilitate unidirectional flow of magnetic flux within the magnets and focus the magnetic flux to the nearest stator tooth to facilitate capturing substantially all of the flux generated by the magnets. The elimination of eddy currents within the magnets and directing substantially all the flux through the shims and into the stator teeth significantly improves the efficiency of the electric machine and causes the machine to produce less noise. Moreover, the shims enable the use of an open-slot stator core, which reduces the cost of manufacture and eases the burden of assembly. Furthermore, eliminating eddy currents within the magnets reduces heat generation within the machine, which further improves efficiency and reduces the occurrence of adhesive failure.

The embodiments described herein relate to permanent magnet electrical machines and methods of assembling the same. More specifically, the embodiments relate to a rotor assembly that eliminates eddy currents and improves efficiency. More particularly, the embodiments relate to coupling a shim of isometric soft magnetic composite to each of the permanent magnets of the rotor to facilitate channeling the flux generated by the magnets to the stator teeth. The methods and apparatus are not limited to the specific embodiments described herein, but rather, components of apparatus and/or steps of the methods may be utilized independently and separately from other components and/or steps described herein. For example, the methods may also be used in combination with radial flux electric machines and methods, and are not limited to practice with only the axial flux electric machines and methods as described herein. Rather, the exemplary embodiment can be implemented and utilized in connection with many other electrical machine applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A permanent magnet rotor assembly for use in an axial flux electric machine having an axis of rotation, said permanent magnet rotor assembly comprising:

a rotor disk comprising a first horizontal surface and a second horizontal surface axially displaced from said first horizontal surface by a first distance, said rotor disk has a first side and a second side opposite said first side, said first horizontal surface and said second horizontal surface positioned on said first side of said rotor disk, a plurality of recesses formed in said second horizontal surface wherein each recess of said plurality of recesses comprises a third horizontal surface axially displaced from said first horizontal surface, wherein said rotor disk further comprises a rim integrally formed as part of said rotor disk and positioned radially outward from said plurality of recesses such that a radial gap is defined between said rim and said plurality of recesses, a top of said rim forms said first horizontal surface;

a plurality of permanent magnets coupled to said rotor disk, wherein each permanent magnet is coupled to said third horizontal surface of a respective recess of said plurality of recesses, wherein a top of each of said plurality of permanent magnets forming a fourth horizontal surface is axially displaced from said second horizontal surface by a second distance greater than said first distance; and a plurality of magnet shims coupled to said plurality of permanent magnets opposite said third horizontal surface of said rotor disk, wherein each magnet shim has a substantially complementary shape as a respective permanent magnet of said plurality of permanent magnets, wherein a top of each of said plurality of magnet shims forming a fifth horizontal surface axially displaced from said first horizontal surface and said second horizontal surface, said plurality of magnet shims configured to direct magnetic flux from at least one of said plurality of permanent magnets to at least one stator tooth of a stator core, wherein the magnetic flux flows within each permanent magnet in a first direction that is substantially parallel to the axis of rotation.

2. The permanent magnet rotor assembly in accordance with claim 1, wherein the first direction of magnetic flux within each permanent magnet is different from a second direction of the magnetic flux flow within a respective magnet shim.

3. The permanent magnet rotor assembly in accordance with claim 1, wherein magnetic flux is directed by each magnet shim to a nearest respective stator tooth such that the magnetic flux is distributed between more than one stator tooth as said rotor assembly rotates with respect to said stator core.

4. The permanent magnet rotor assembly in accordance with claim 1, wherein said plurality of magnet shims is configured to facilitate a unidirectional flow of magnetic flux within said plurality of permanent magnets.

5. The permanent magnet rotor assembly in accordance with claim 1, wherein said plurality of magnet shims is formed from an isotropic soft magnetic composite (SMC) material.

6. The permanent magnet rotor assembly in accordance with claim 1, wherein each magnet shim includes a pair of opposing side faces that are flush with a pair of corresponding opposing side faces of a respective permanent magnet of said plurality of permanent magnets.

7. The permanent magnet rotor assembly in accordance with claim 1, wherein each magnet shim includes a pair of opposing side faces that extend beyond a pair of corresponding opposing side faces of a respective permanent magnet of said plurality of permanent magnets.

8. An axial flux electric machine comprising:

a shaft configured to rotate about an axis of rotation;

a permanent magnet rotor assembly coupled to said shaft and configured to rotate about the axis of rotation, said permanent magnet rotor assembly comprising:

a rotor disk comprising a plurality of recesses extending into a bottom surface of said rotor disk, wherein said rotor disk further comprises a first axial end surface axially offset from said bottom surface by a first distance, said rotor disk comprising a shaft opening configured to receive said shaft, said rotor disk has a first side and a second side opposite said first side, said first axial end surface and said bottom surface positioned on said first side of said rotor disk;

a plurality of permanent magnets coupled to said rotor disk, wherein each permanent magnet is coupled to an end surface of a respective recess of said plurality of recesses, said end surface axially offset from said bottom surface and said first axial end surface, wherein a top of each of said plurality of permanent magnets forming a magnet surface is axially displaced from said bottom surface by a second distance greater than said first distance; and a plurality of magnet shims coupled to said plurality of permanent magnets opposite said rotor disk, wherein said plurality of magnet shims include a second axial end surface axially offset from said bottom surface by a third distance that is larger than the first distance, wherein each magnet shim has a substantially complementary shape as a respective permanent magnet of said plurality of permanent magnets, wherein said rotor disk comprises a rim integrally formed as part of the rotor disk and configured to retain said plurality of permanent magnets, wherein said rim is positioned radially outward from the plurality of recesses such that a radial gap is defined between the rim and the plurality of recesses, said rim comprises an inner edge, wherein said bottom surface extends radially from said shaft opening to said inner edge of said rim, a top of said rim forms said first axial end surface; and a stator core comprising a plurality of stator teeth defining a plurality of slots therebetween, wherein at least one of said plurality of magnet shims is configured to direct magnetic flux from at least one of said plurality of permanent magnets to at least one stator tooth of said plurality of stator teeth, wherein the magnetic flux flows within each permanent magnet in a first direction that is substantially parallel to the axis of rotation.

9. The electric machine in accordance with claim 8, wherein said plurality of magnet shims is configured to facilitate a unidirectional flow of magnetic flux within said plurality of permanent magnets.

10. The electric machine in accordance with claim 8, wherein the first direction of magnetic flux within each permanent magnet is different from a second direction of magnetic flux flow within a respective magnet shim.

11. The electric machine in accordance with claim 8, wherein magnetic flux is directed by each magnet shim to a nearest respective stator tooth such that the magnetic flux generated by each permanent magnet is distributed between more than one stator tooth as said rotor assembly rotates with respect to said stator core.

12. The electric machine in accordance with claim 8, wherein said stator core includes a retention member that spans each slot, wherein each retention member is coupled within an indentation on adjacent stator teeth of said plurality of stator teeth.

13. The electric machine in accordance with claim 8, wherein said stator core is an open slot stator core.

14. The electric machine in accordance with claim 8, wherein each magnet shim of said plurality of magnet shims is coupled to a respective permanent magnet of said plurality of permanent magnets.

15. A method of assembling an axial flux permanent magnet machine having an axis of rotation, the method comprising:

providing a plurality of permanent magnets;

coupling the plurality of permanent magnets to a rotor disk, wherein the rotor disk includes a first internal surface and a plurality of recesses formed in the first internal surface wherein each recess of the plurality of recesses includes a second internal surface axially displaced from the first internal surface, the rotor disk has a first side and a second side opposite the first side, and wherein each permanent magnet is coupled to the second internal surface of a respective recess of the plurality of recesses, the rotor disk includes a shaft opening configured to receive a shaft, the rotor disk further includes a rim integrally formed as part of the rotor disk and positioned radially outward from the plurality of recesses such that a radial gap is defined between the rim and the plurality of recesses, the rim includes an inner edge, a top of the rim forms a third internal surface axially displaced from the first internal surface by a first distance, the first internal surface and the third internal surface positioned on the first side of the rotor disk, the first internal surface extends from the shaft opening to the inner edge, wherein a top of each of the permanent magnets forming a magnet surface is axially displaced from the first internal surface by a second distance greater than the first distance;

coupling a plurality of magnet shims to the plurality of permanent magnets opposite the rotor disk such that the plurality of magnet shims contact only the plurality of permanent magnets, wherein a top of each of the plurality of magnet shims forming a fourth internal surface axially displaced from the third internal surface and the first internal surface, wherein each magnet shim has a substantially complementary shape as a respective permanent magnet of the plurality of permanent magnets, wherein the rotor disk includes a monolithic component configured to retain the plurality of permanent magnets; and positioning a stator core that includes a plurality of stator teeth proximate to the plurality of magnet shims to define an air gap therebetween, wherein at least one of the plurality of magnet shims is configured to direct magnetic flux from at least one of the plurality of permanent magnets across the air gap to at least one stator tooth of the plurality of stator teeth, wherein the magnetic flux flows within each permanent magnet in a first direction that is substantially parallel to an axis of rotation.

16. The method in accordance with claim 15 further comprising directing magnetic flux, utilizing each magnet shim, to a nearest respective stator tooth such that magnetic flux is distributed between more than one stator tooth as the rotor disk rotates with respect to the stator core.

17. The method in accordance with claim 15 further comprising directing magnetic flux in the first direction within each permanent magnet that is different from a second magnetic flux flow direction within a respective magnet shim.

18. The method in accordance with claim 15, wherein the plurality of magnet shims is configured to facilitate a unidirectional flow of magnetic flux within the plurality of permanent magnets.

19. The method in accordance with claim 15 further comprising forming the plurality of magnet shims from an isotropic soft magnetic composite (SMC) material.

20. The permanent magnet rotor assembly in accordance with claim 1, wherein said plurality of magnet shims have a first thickness, and said plurality of permanent magnets have a second thickness greater than the first thickness.

* * * * *